United States Patent
Tajima et al.

(10) Patent No.: US 6,711,118 B1
(45) Date of Patent: Mar. 23, 2004

(54) OPTICAL INFORMATION RECORDING MEDIUM FOR RECORDING OPTICALLY REPRODUCIBLE SIGNALS THEREON THROUGH THE USE OF A RECORDING LASER BEAM AND METHOD FOR RECORDING OPTICAL INFORMATION THEREON

(75) Inventors: Toshiaki Tajima, Tokyo (JP); Toru Fujii, Tokyo (JP); Yuji Tomizawa, Tokyo (JP); Ryou Negishi, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/506,917

(22) Filed: Feb. 18, 2000

(30) Foreign Application Priority Data

Feb. 19, 1999 (JP) ............................................ 11-040937

(51) Int. Cl.$^7$ ................................................. G11B 7/24
(52) U.S. Cl. .................................... 369/275.4; 428/64.4
(58) Field of Search ........................ 369/275.4, 275.3, 369/277, 288, 283, 275.1, 112.23, 275.2, 13.55; 428/64.4, 64.1, 64.5

(56) References Cited

U.S. PATENT DOCUMENTS

| | | | | |
|---|---|---|---|---|
| 5,798,987 | A | * | 8/1998 | Ogawa ..................... 369/13.55 |
| 5,972,459 | A | * | 10/1999 | Kawakubo et al. ........ 428/64.1 |
| 6,154,440 | A | * | 11/2000 | Ichihara .................... 369/275.4 |
| 6,246,656 | B1 | * | 6/2001 | Kawakubo et al. .... 369/112.23 |
| 6,400,677 | B2 | * | 6/2002 | Kagawa et al. .......... 369/275.4 |
| 6,452,899 | B1 | * | 9/2002 | Fujii et al. ................ 369/275.4 |
| 6,490,240 | B1 | * | 12/2002 | Usami ...................... 369/275.4 |

* cited by examiner

Primary Examiner—Ali Neyzari
(74) Attorney, Agent, or Firm—Katten Muchin Zavis Rosenman (57) ABSTRACT

An optical information recording medium provides a high reflectance of a laser beam and thus enables an accurate tracking servo. The optical information recording medium, for recording optically readable signals thereon through the use of a recording laser beam, includes a light transmitting substrate, a tracking groove formed on a surface of the light transmitting substrate, a land formed between two neighboring tracks of the tracking groove, a recording layer formed on a surface of the light transmitting substrate on which the tracking groove and the land are provided, and a reflective layer formed on the recording layer for reflecting the recording laser beam. A top width D of the land is arranged to be within the range of about $0.30 \leq D \leq 0.45$ μm.

14 Claims, 5 Drawing Sheets

OPTICAL INFORMATION RECORDING MEDIUM FOR RECORDING OPTICALLY REPRODUCIBLE SIGNALS THEREON THROUGH THE USE OF A RECORDING LASER BEAM AND METHOD FOR RECORDING OPTICAL INFORMATION THEREON

FIELD OF THE INVENTION

The present invention relates to an optical information medium capable of recording optically readable information; and, more particularly, to an optimum optical information recording medium adapted for use in recording and reproducing high-density optical information by employing a red laser beam having short wavelengths in the range from 630 to 670 nm.

DESCRIPTION OF THE PRIOR ART

A digital video disc (DVD) capable of recording and reproducing high-density information has been put into practical use by the help of the recent development and practical utilization of a laser having a short wavelength. In DVD, there are provided an information recording area on at least one main surface thereof, a plurality of pits retaining recorded information and formed on the information recording area, and a reflective layer formed of a metal film and provided on the whole information recording area.

In order to implement the recording and reproduction of high-density information in DVD, DVD standards are established, which are different from those of the compact disc (CD), currently the most widely used optical information recording medium. For instance, according to the standards of the DVD, one DVD disc is required to have a maximum storage capacity of about 4.7 GB, big enough to record video and audio information for an average running time of about 133 min.

Since, however, the current DVD standards are specified only for a read-only DVD such as a DVD-Video storing prerecorded video information and a DVD-ROM storing prerecorded computer program or data, there exist pressing needs to develop a recordable optical information medium having a maximum storage capacity of about 4.7 GB and a recording technique therefor.

The DVD described above has a track pitch of 0.74 $\mu$m and a minimum pit size of 0.4 $\mu$m (or 0.44 $\mu$m in the case of a DVD having dual recording layers); and, therefore, it is possible to achieve higher density recording in DVD than in CD having a track pitch of 1.6 $\mu$m and a minimum pit size of 0.83 $\mu$m.

A recordable DVD is typically provided with a light transmitting substrate having thereon a tracking groove arranged to have a tracking pitch of 0.74 $\mu$m as described above, a recording layer made of a material such as an organic dye formed on the substrate, and a reflective layer made of, e.g., Au or Al formed on the recording layer. Optical information signals can be recorded on such a DVD by forming pits on the light transmitting substrate by irradiating a recording laser beam onto the recording layer. To this end, accurate tracking servo should be ensured by way of, e.g., employing a single wavelength red laser beam within the range of 630–670 nm focused into an extremely small spot. A phase difference method can be used for the tracking servo. However, an access using a phase difference tracking error signal and a radial contrast signal becomes unstable when the radial contrast signal is small. The access described herein indicates a track jump.

SUMMARY OF THE INVENTION

In view of the foregoing drawback of the conventional high-density optical information recording medium, a primary object of the present invention is to provide an optical information medium capable of recording optically readable high-density signals in comparison to CD while securing high radial contrast signals to allow stable access.

Another object of the present invention is to provide an optical information medium capable of forming desired pits thereon, entailing reduced jitters while recording high-density signals.

To achieve the above objects, the width D of the top surface of a land is set to be within the range of about $0.30 \leq D \leq 0.45$ to obtain high radial contrasts in accordance with the present invention. Improved radial contrasts can thus be obtained. A radial contrast represents a value obtained by normalizing the difference between the average levels of the high frequency (HF) signals from a land and a pit after recording by the mean value thereof.

In accordance with the present invention, there is provided an optical information recording medium for recording optically readable signals thereon through the use of a recording laser beam, comprising: a light transmitting substrate; a tracking groove of a spiral shape formed on a surface of the light transmitting substrate; a land formed between the spiral groove; a recording layer formed on the surface of the light transmitting substrate on which the groove and the land are provided; and a reflective layer, formed on the recording layer, for reflecting the recording laser beam, wherein optically readable signals are recorded by the recording laser beam provided through the light transmitting substrate and a width D of the top surface of the land is within the range of about $0.30 \leq D \leq 0.45$.

The width D described above represents a length of a flat portion of the top surface of the land measured along the radial direction, and, more specifically, a radial length of a portion of the land parallel to the plane of incidence of the recording laser beam.

If D described is within the range of about $0.30 \leq D \leq 0.45$, large radial contrasts can be obtained from the recorded optical information recording medium and, therefore, accurate tracking can be carried out during the reproduction of the recorded information. On the other hand, if D is less than 0.3, radial contrasts from the recorded optical information recording medium may not be big enough to properly reproduce the recorded optical information. And also, if D is greater than 0.45, the width of the groove of the optical information recording medium may not be big enough to secure proper recording and reproduction of the optical signals.

In addition, it is preferable that a dimension of a protrusion, which can be formed on a peripheral region of the top surface of the land during an injection molding process of the light transmitting substrate, is less than about 10 nm. If the protrusion is larger than about 10 nm, the width D of the land may not be greater than 0.3 $\mu$m.

Further, it is also preferable that the ratio D/C of the width D of the land at the top portion thereof to the width C of the land at the bottom portion thereof is within the range of about 0.55–about 0.9. The bottom width C represents a length of the land measured at the bottom thereof along the radial direction (shown in FIG. 4). If the ratio, top width D/bottom width C, is less than about 0.55, push-pull values or the degree of modulation becomes small, and therefore, recording and reproduction of the optical information may not be performed properly. Also, if the ratio D/C is larger than about 0.90, the top width D may not be properly secured due to deteriorated transferability of a stamper shape occurring during the injection molding process of the light transmitting substrate.

In addition, it is also preferable that the thermal conductivity p of the recording layer is within the range of about $0.15 \leq p \leq 0.25$ W/mK. If the thermal conductivity of the recording layer is less than about 0.15 W/mK, a jitter becomes large. On the other hand, if the thermal conductivity of the recording layer is greater than about 0.25 W/mK, a proper degree of modulation may not be obtained. The recording layer is made out of an organic dye containing therein a light stabilizer; and the thermal conductivity of the recording layer depends on the materials included in the dye solution, a composition thereof and the thickness of the recording layer itself and can be varied by changing the dependence on them. A preferable dye includes a cyanine dye, a phthalocyanine dye, an azo dye, a polymethine dye, a triarylmethane dye, a pyrylium dye, a phenanthrene dye, a tetrahydrocholine dye, a triarylamine dye, a croconic methine dye, a merocyanine dye and the like or their mixture, although not limited thereto.

It is preferable that a leveling index $L(=1-B/A)$ is within the range of about $0.2 \leq L \leq 0.5$. Herein, the leveling index L represents a degree of flatness of the recording layer; A, a depth of the tracking groove; and B, a depth of the recording layer on the groove(shown in FIG. 4). Therefore, as the leveling is more pronounced, the difference between the depth A of the pre-groove and the depth B of the recording layer becomes greater, and thus the value of L increases. If L is equal to zero, which is practically impossible, it means that the recording layer is not leveled at all and thus the depth A of the pre-groove is identical to the depth B of the recording layer. On the other hand, the value of L=1 means that the recording layer is perfectly leveled and thus the depth B of the recording layer is zero. If the leveling index L is within the range above, the thermal conductivity p of the recording layer can be easily controlled to be within the range of about $0.15$ W/mK $\leq p \leq 0.25$ W/mK. If L is less than about 0.2, the thermal conductivity becomes large, and the proper degree of modulation may not be obtained. If L is greater than about 0.5, the thermal conductivity decreases, which in turn deteriorates the jitter.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the invention will be explained in detail with reference to the drawings.

Figure 1:
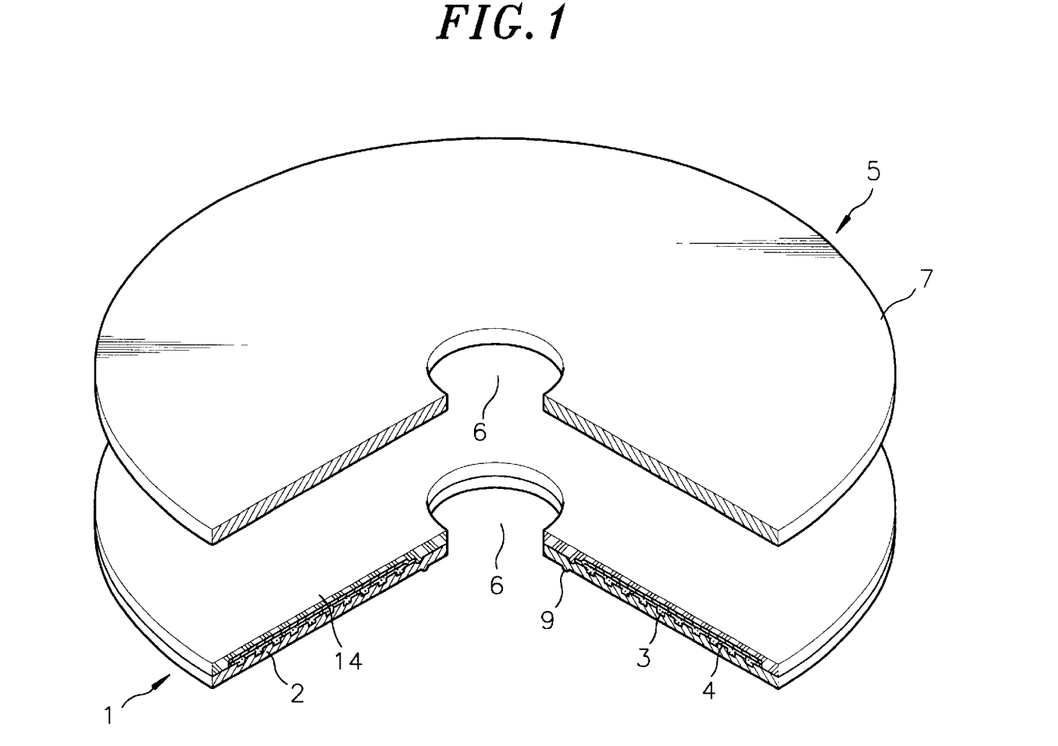
FIG. 1 illustrates a cross-sectional perspective view of two discs before being bonded together to construct an exemplary optical information recording medium.

An optical information recording medium in accordance with the present invention is described with reference to FIGS. 1 and 2 by exemplifying a WORM (write once, read many times) type optical information recording medium having a structure in which two discs are bonded together and optical information is recorded and reproduced on and from one side thereof.

A light transmitting substrate 2 of a disc 1 is of a transparent circular plate-shaped structure having a hole 6 at the center thereof. The light transmitting substrate 2 is most preferably formed of a transparent resin such as polycarbonate or polymethylmetacrylate (PMMA).

The light transmitting substrate 2 is provided with a clamping area and an outer peripheral portion of the clamping area serves as an information recording area. On the information recording area, there is formed a tracking groove 3 having a continuous spiral shape covering throughout the information recording area. In the region between two radially adjacent tracks of the tracking groove 3, there is formed a land 4. A pitch P of the tracking groove 3(shown in FIG. 4) is normally set to be about 0.74 μm.

Further, a recording layer 12 is formed on the main surface of the light transmitting substrate 2 on which the information recording area is provided. For instance, the recording layer 12 is formed by, e.g., spin-coating an organic dye on the surface of the light transmitting substrate 2. On the recording layer 12, there is formed a reflective layer 13 made of a metal such as gold, aluminum, silver, copper or the like, or an alloy thereof. The reflective layer 13 is covered with a protection layer 14 made of a UV-curable resin or the like.

Now, along with the disc 1, there is provided one more disc 5 having a substrate 7. The substrate 7 may be made of the same material and have the same size as those of the light transmitting substrate 2. The disc 5 may not be provided with a recording layer and a reflective layer on a surface thereof as in the disc 1. However, it is also possible for the disc 5 to include a recording layer and a reflective layer thereon as in the disc 1.

Next, the two discs 1 and 5 are bonded together. For instance, a reactive curable resin serving as an adhesive layer 11 is coated on the main surface of at least one of the two discs 1 and 5 by means of the spin coating process or a screen printing method. The two discs 1 and 5 are then overlapped with each other having the adhesive layer 11 therebetween and are bonded together by the adhesive layer 11 being cured. In this case, the surface of the disc 1 having the protection layer 14 is bonded to the disc 5.

Figure 2:
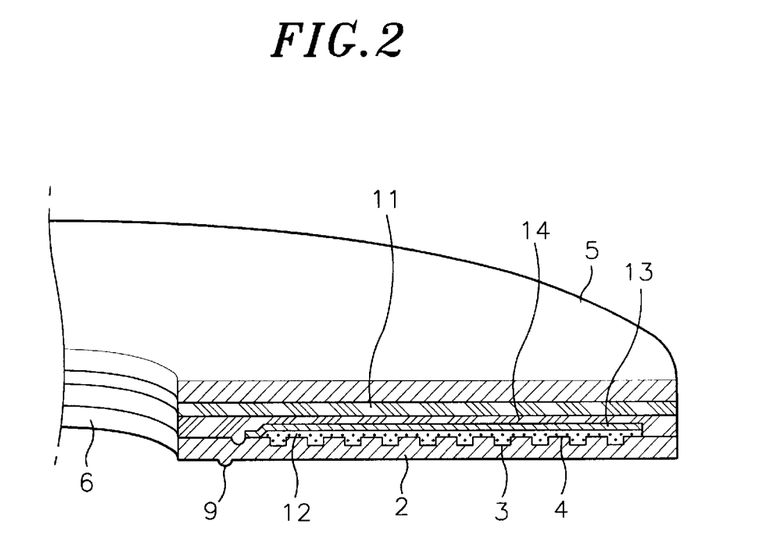
FIG. 2 presents a partial cross-sectional perspective view of the exemplary optical information recording medium.
Figure 3:
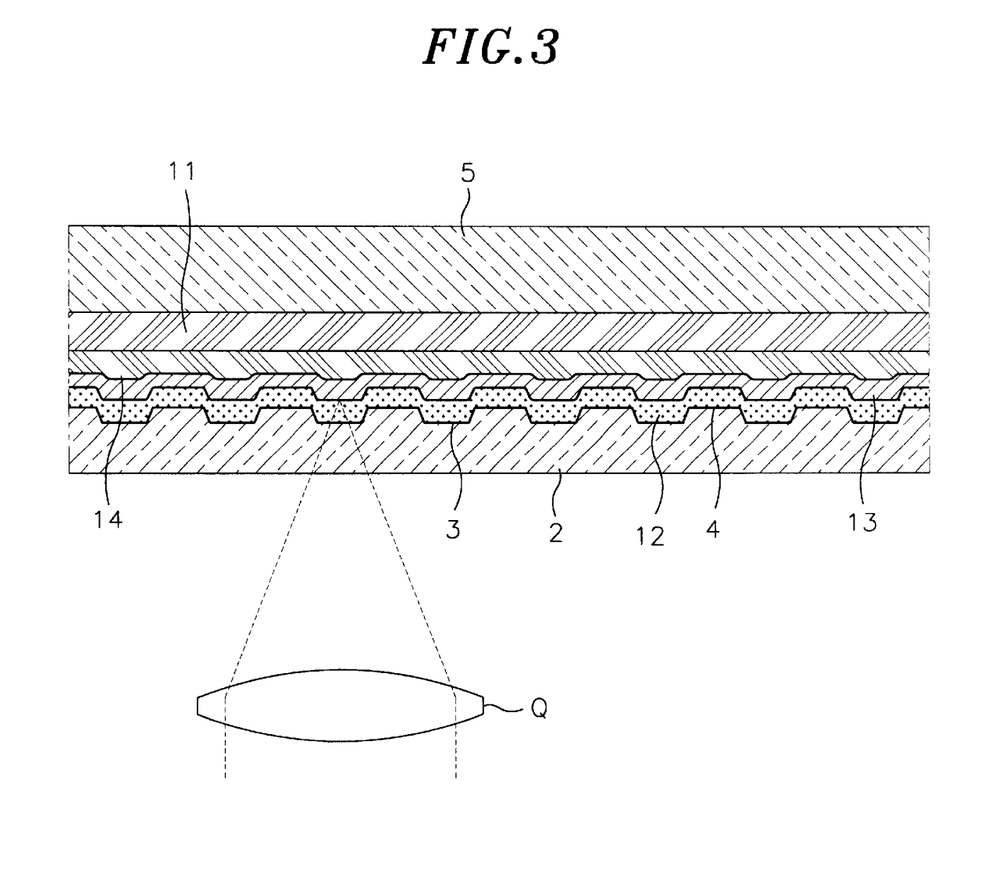
FIG. 3 provides a cross-sectional view of a recording area of the exemplary optical information recording medium.

FIGS. 2 and 3 depict a case where the disc 1, including the recording layer 12 and the reflective layer 13 formed on the light transmitting substrate 2 having the tracking groove 3, and the other disc 5, including neither a recording nor a reflective layer thereon, are bonded together. In such a case, optical information can be recorded on and reproduced from only one surface of the bonded discs. The other disc 5 may be provided with a non-transparent substrate, or may be colored for improving light resistance, or may have an area where characters or patterns can be written.

Alternatively, both the two discs may be provided with recording layers and reflective layers formed on light transmitting substrates each having a tracking groove. Then, these two discs are bonded together with the transmitting substrates facing outside, thereby forming an optical information recording medium capable of recording and reproducing optical information at both surfaces thereof.

A protrusion 9 is provided on the surface of the light transmitting substrate 2 upon which the recording laser beam is incident. The protrusion 9 is of a ring shape arranged at the outside of the information recording area. The protrusion 9 serves to protect the surface of stacked optical information recording mediums from contacting with each other.

Figure 4:
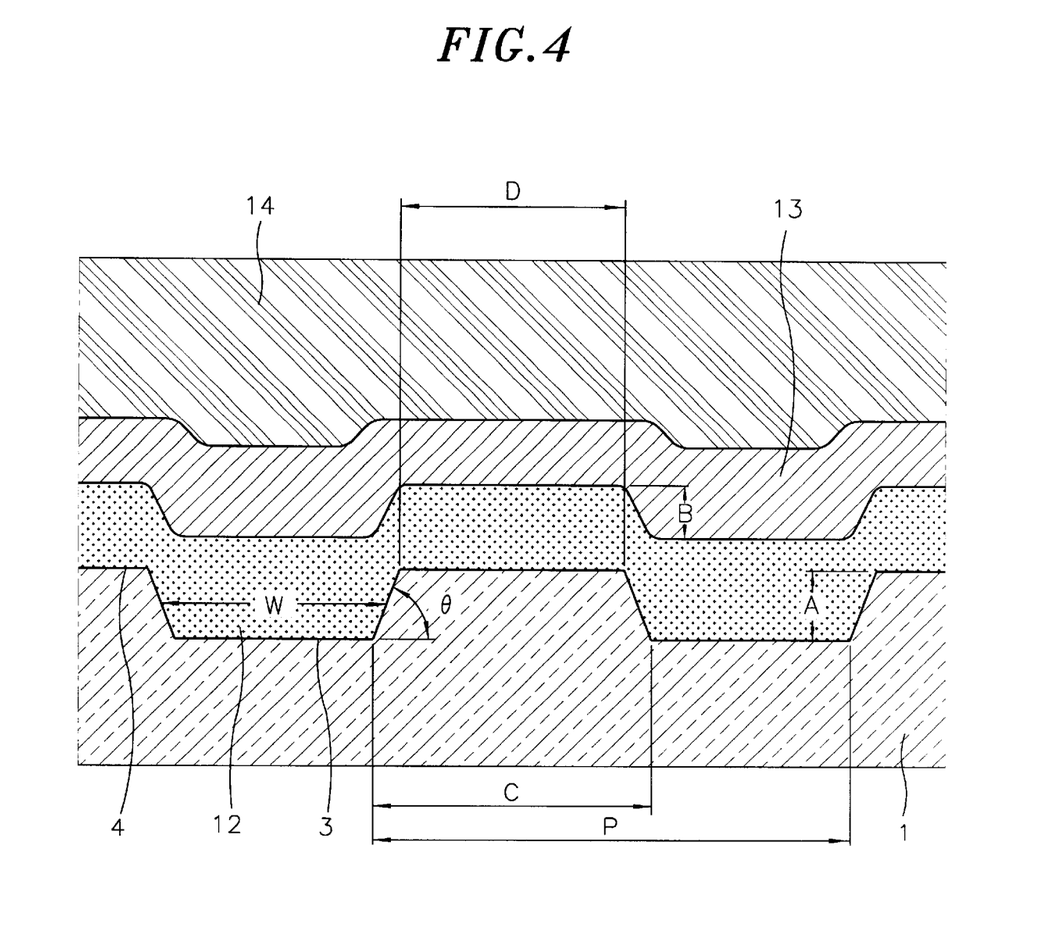
FIG. 4 depicts an enlarged cross-sectional view representing dimensions and angles in the recording area.

FIG. 3 is a cross-sectional view showing parts of the information recording area on which the recording layer 12 and the reflective layer 13 are formed; and FIG. 4 is an enlarged cross-sectional view showing the recording layer 12 and the reflective layer 13.

As shown in FIG. 4, there is provided the tracking groove 3 of the spiral shape on the surface of the light transmitting substrate 2 where the recording layer 12 is to be formed; and it is preferable that the sloping angle θ of each side surface of the tracking groove 3 with respect to the plane of incidence of the recording laser beam is within the range of about 55~80°.

High quality land pre-pits(not shown) can be also formed on top of the land 4 of the present invention.

Further, it is preferable that a leveling index L(=1−B/A) falls within the range from about 0.2 to about 0.5, wherein A represents a depth of the tracking groove 3 and B is a depth of a recess in the recording layer 12, both being measured at an identical location. The leveling index L represents a degree of leveling or flatness of the recording layer 12 formed by, e.g., spin-coating an organic dye solution on the light transmitting substrate 2 having the tracking groove 3. The larger leveling index implies the ratio B/A is smaller. The leveling index L can be varied by adjusting physical properties of the recording layer 12 and/or spin-coating conditions.

It is also preferable that an FWHM W (full width half maximum) of the tracking groove 3 on the light transmitting substrate 2 is within the range from about ⅓ to about ½ of the pitch P of the groove 3 at an identical location. The FWHM W of the tracking groove 3 represents its width at a half of the depth thereof.

Figure 5A:
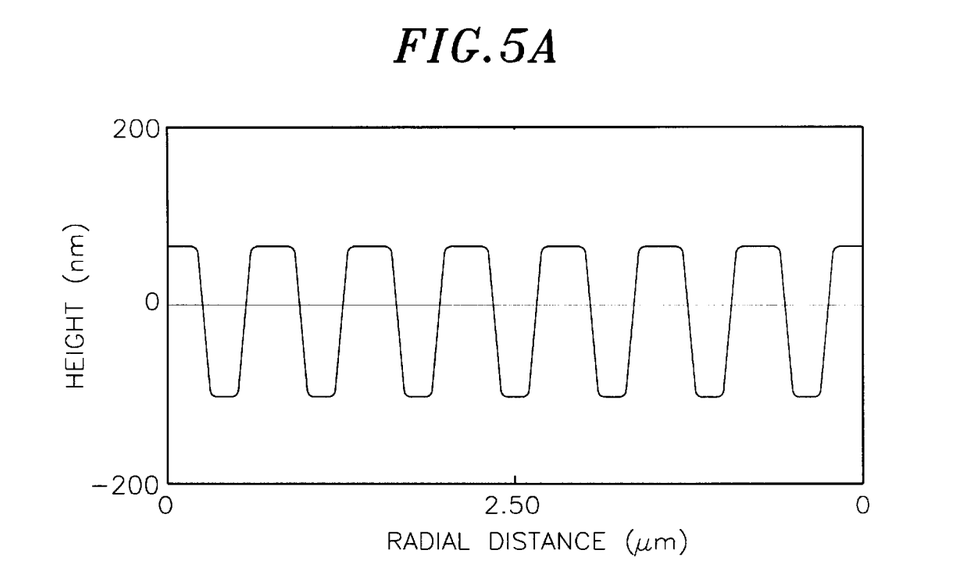
FIGS. 5A to 5C present various AFM measurement results taken along the radial direction of the surfaces of light transmitting substrates.
Figure 5B:
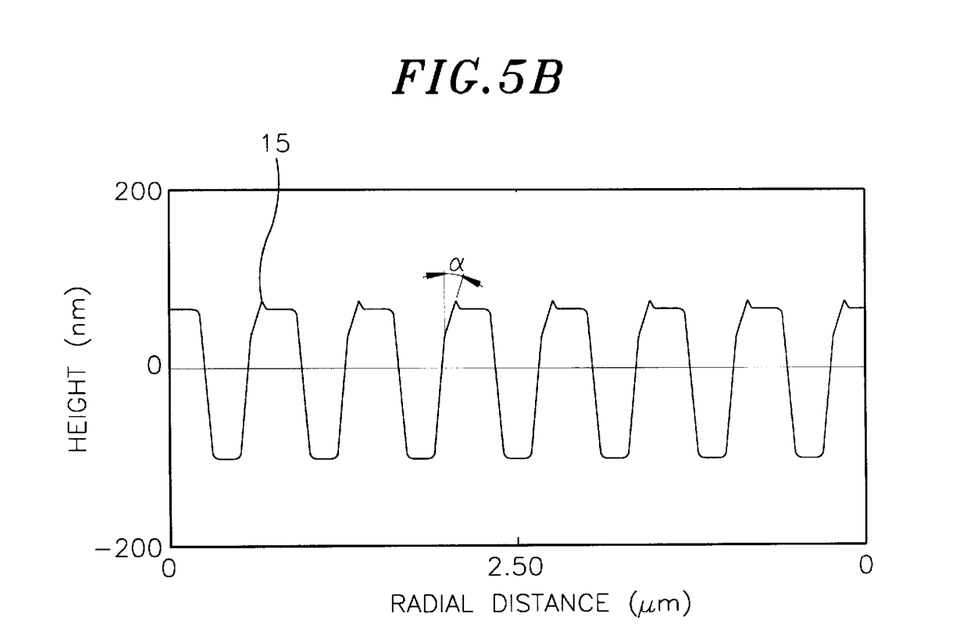
Figure 5C:
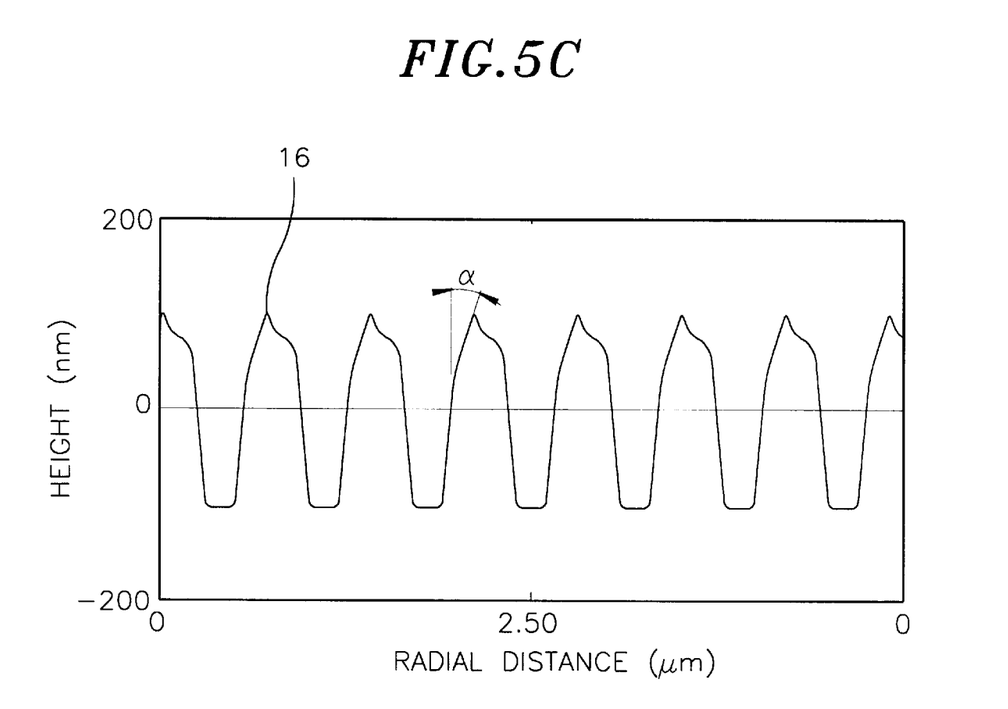

The tracking pitch P shown in FIG. 4 is set to be about 0.74 μm as in the convention DVD. In accordance with the present invention, however, the top width D and the bottom width C of the land 4 are preferably set to be within the ranges of about 0.45 μm~about 0.45 μm and about 0.31 μm~about 0.53 μm, respectively, while maintaining the tracking pitch of 0.74 μm. The shapes of the land and the groove play a major role in satisfying the dimensional requirements of the land described above. Referring to FIGS. 5A to 5C, there are illustrated exemplary cross-sectional views of grooves and lands taken by scanning the surfaces of various light transmitting substrates along the radial direction thereof by using an AFM (Nanoscope IIIa atomic force microscope from Digital Instrument, Inc.). In each drawing, the valleys represent a tracking groove and the peaks between the valleys correspond to a land.

FIG. 5A is a cross-sectional view of the groove 3 and the land 4 of the light transmitting substrate 2 having a preferable cross-sectional shape, wherein the top surface of the land 4 is flat without any protrusions. Such a surface morphology can be obtained by detaching the light transmitting substrate 2 from a stamper in a direction normal to the top surface of the land 4 during an injection molding process.

FIG. 5B shows a land having a protrusion 15 in the shape of a ridge at a peripheral region of the top surface of the land and a secondary sloping side positioned adjacent to the protrusion 15. The protrusions 15 are formed at the time of detaching a light transmitting substrate from a stamper during the injection molding process. In case there exist such protrusions, it is preferable that the heights thereof measured from the top surface of the land are less than 10 nm.

In FIG. 5C, there is shown a cross-sectional view of a land having a completely corrupted shape with an abnormally large protrusion 16 and a large sloping angle α at a top peripheral region of the land 4. In this case, it may not be possible to obtain a proper radial contrast, causing tracking errors to occur.

Now, the present invention will be described in further detail with reference to Examples. However, it should be understood that the present invention is by no means restricted to such specific Examples.

EXAMPLE 1

A polycarbonate substrate serving as the light transmitting substrate 2 has been prepared with the tracking groove 3 on its main surface, the substrate having an outer diameter of 120 mm, an inner diameter of 15 mm, a thickness of 0.579 mm and a refractive index of 1.59. The FWHM W of the tracking grooves 3 was 0.31 μm; the depth A, 140 nm; the sloping angle θ at both sides, 65°; and the tracking pitch P, 0.74 μm. The top width D of the land 4 was 0.32 μm. Also, the bottom width C of the land 4 was 0.53 μm and D/C was 0.60.

Then, the recording layer 12 was formed by spin-coating a cyanine dye (or trimethine dye) solution on the surface of the light transmitting substrate 2 having the tracking groove 3.

In this example, the leveling index L(=1−B/A) of the recording layer 12 was 0.25. Also, the thermal conductivity p of the recording layer 12 was 0.23 W/mK.

Next, the reflective layer 13 was formed on the recording layer 12 by sputtering Au. The protection layer 14 was then formed by spin-coating the UV-curable resin(SD211 from Dainippon Inks Mfg. Co., Ltd.) on the reflective layer 13 and curing the resin through the irradiation of UV rays. Finally, an optical information recording medium was provided by coating a UV-curable resin-based adhesive on the protection layer 14; placing a second substrate thereon, the second substrate being of the same material and shape as those of the light transmitting substrate 2 but devoid of a groove, a recording layer and a reflective layer thereon; and irradiating UV rays so as to cure the adhesive, the surface of the light transmitting substrate 2 having the protection layer 14 being bonded to the second substrate.

EFM(eight to fourteen modulation)-Plus signals(8–16 modulation signals) were recorded on the optical information recording medium provided as described above with a laser having the wavelength of 635 nm and the recording power of 10 mW through the use of an optical pick-up having an object lens Q(shown in FIG. 3) with a numerical aperture(NA) of 0.6. From the optical information recording medium described above, preferable results have been obtained as follows: a radial contrast value was 0.18, a push-pull value was 0.3; the degree of modulation of the recorded signals was 64%; the maximum value of errors in the lengths of pits and lands for each signal were 6.0 ns; a jitter was 7.5%; and a reflectance was 65%.

EXAMPLE 2

In this example, an optical information recording medium has been fabricated in a similar manner as in the first example, excepting that the top width D of the land 4 was 0.38 μm. In this case, D/C was 0.72.

The leveling index L(=1−B/A) of the recording layer 12 was 0.33 and the thermal conductivity of the recording layer 12 was 0.2 W/mK.

EFM-Plus signals were recorded on the optical information recording medium fabricated as described above with a laser having the wavelength of 635 nm and the recording power of 12 mW through the use of an optical pickup having an object lens Q with an NA of 0.6. The recorded medium was played back 10 times while repeatedly loading and unloading the medium by using a commercially available DVD player, during which the reproduction was stable without any reproduction errors. From the optical information recording medium described above, preferable results have been obtained as follows: a radial contrast value was 0.20; a push-pull value was 0.35; the degree of modulation of the recorded signals was 70%; the maximum value of errors in the lengths of pits and lands for each signal was 5.0 ns; a jitter was 6.7%; and a reflectance was 63%.

EXAMPLE 3

In this example, an optical information recording medium has been fabricated in a similar manner as in the first example, excepting that the top width D of the land 4 was 0.42 μm. In this case, D/C was 0.79.

Also, the leveling index L(=1−B/A) of the recording layer 12 was 0.38 and the thermal conductivity of the recording layer 12 was 0.18 W/mK.

EFM-Plus signals were recorded on the optical information recording medium fabricated as described above with a laser having the wavelength of 635 nm and the recording power of 10 mW through the use of an optical pickup having an object lens Q with an NA of 0.64. The recorded optical information recording medium was played back 10 times while repeatedly loading and unloading the medium by using a commercially available DVD player, during which the reproduction was stable without any reproduction errors. From the optical information recording medium described above, preferable results have been obtained as follows: a radial contrast value was 0.21; a push-pull value was 0.38; the degree of modulation of the recorded signals was 75%; the maximum value of errors in the lengths of pits and lands for each signal was 5.0 ns; a jitter was 6.7%; and a reflectance was 58%.

COMPARATIVE EXAMPLE 1

In this example, an optical information recording medium has been fabricated in a similar manner as in the first example, excepting that the top width D of the land of the light transmitting substrate 2 was 0.25 μm. In this case, D/C was 0.47.

The leveling index L(=1−B/A) of the recording layer 12 was 0.18 and the thermal conductivity thereof was 0.27 W/mK.

EFM-Plus signals were recorded on the optical information recording medium fabricated as described with a laser having the wavelength of 635 nm and the recording power of 10 mW through the use of an optical pick-up having an object lens Q with an NA of 0.6. The recorded optical information recording medium was played back 10 times while repeatedly loading and unloading the medium by using a commercially available DVD player, during which the DVD player could not reproduce recorded signals 7 times. In this case, following results have been obtained: a radial contrast value was 0.07; a push-pull value was 0.20; the degree of modulation of the recorded signals was 70%; a jitter was 14%; and a reflectance was 45%. The jitter obtained above does not satisfy the DVD standards, which require a jitter not to be greater than 8%.

COMPARATIVE EXAMPLE 2

In this example, an optical information recording medium has been fabricated in a similar manner as in the second example, excepting that the top width D of the land of the light transmitting substrate 2 was 0.48 μm. In this case, D/C was 0.91.

The leveling index L(=1−B/A) of the recording layer 12 was 0.52 and the thermal conductivity thereof was 0.13 W/mK.

EFM-Plus signals were recorded on the optical information recording medium fabricated as described above with a laser having the wavelength of 635 nm and the recording power of 10 mW through the use of an optical pick-up having an object lens Q with an NA of 0.6. The recorded optical information recording medium was played back 10 times while repeatedly loading and unloading the medium by using a commercially available DVD player, during which the DVD player could not reproduce recorded signals 7 times. Following results have been obtained in this case: a radial contrast value was 0.07 and a push-pull value was 0.10. The degree of modulation of the recorded signals was 50%; a jitter was 8%; and a reflectance was 68%. The degree of modulation thus obtained does not satisfy the DVD standards, which require the degree of modulation not to be less than 60%.

As described, the optical information recording medium of the present invention is capable of recording optically readable high-density signals thereon while enabling stable access.

While the present invention has been described with respect to the preferred embodiments, other modifications and variations may be made without departing from the spirit and scope of the present invention as set forth in the following claims.

What is claimed is:

1. An optical information recording medium for recording optically reproducible signals thereon through the use of a recording laser beam, comprising:

a light transmitting substrate;

a tracking groove formed on a surface of the light transmitting substrate;

a land formed between radially adjacent tracks of the tracking groove;

a recording layer formed on the surface of the light transmitting substrate on which the tracking groove and the land are provided; and a reflective layer, formed on the recording layer, for reflecting the recording laser beam, wherein a top width D of the land is within the range of about 0.30≦D≦0.45 μm, and wherein a ratio of the top width of the land to a bottom width of the land is within the range from about 0.55 to about 0.90.

2. An optical information recording medium for recording optically reproducible signals thereon through the use of a recording laser beam, comprising:

a light transmitting substrate;

a tracking groove formed on a surface of the light transmitting substrate;

a land formed between radially adjacent tracks of the tracking groove;

a recording layer formed on the surface of the light transmitting substrate on which the tracking groove and the land are provided; and a reflective layer, formed on the recording layer, for reflecting the recording laser beam, wherein a top width D of the land is within the range of about $0.30 \leq D \leq 0.45$ μm, and wherein a thermal conductivity p of the recording layer is within the range of about $0.15 \leq p \leq 0.25$ W/mK.

3. An optical information recording medium for recording optically reproducible signals thereon through the use of a recording laser beam, comprising:

a light transmitting substrate;

a tracking groove formed on a surface of the light transmitting substrate;

a land formed between radially adjacent tracks of the tracking groove;

a recording layer formed on the surface of the light transmitting substrate on which the tracking groove and the land are provided; and a reflective layer, formed on the recording layer, for reflecting the recording laser beam, wherein a top width D of the land is within the range of about $0.30 \leq D \leq 0.45$ μm, and wherein a leveling index $L(=1-B/A)$ is within the range of about $0.2 \leq L \leq 0.5$, A and B being a depth of the tracking groove and a depth of the recording layer, respectively.

4. The optical information medium according to claim 1, wherein a thermal conductivity p of the recording layer is within the range of about $0.15 \leq p \leq 0.25$ W/mK.

5. The optical information medium according claim 1, wherein a leveling index $L(=1-B/A)$ is within the range of about $0.2 \leq L \leq 0.5$, A and B being a depth of the tracking groove and a depth of the recording layer, respectively.

6. The optical information medium according claim 2, wherein a leveling index $L(=1-B/A)$ is within the range of about $0.2 \leq L \leq 0.5$, A and B being a depth of the tracking groove and a depth of the recording layer, respectively.

7. The optical information medium according claim 4, wherein a leveling index $L(=1-B/A)$ is within the range of about $0.2 \leq L \leq 0.5$, A and B being a depth of the tracking groove and a depth of the recording layer, respectively.

8. A method for recording information on the optical information recording medium of claim 1, wherein recording is conducted by irradiating a laser beam through the light transmitting substrate.

9. A method for recording information on the optical information recording medium of claim 2, wherein recording is conducted by irradiating a laser beam through the light transmitting substrate.

10. A method for recording information on the optical information recording medium of claim 3, wherein recording is conducted by irradiating a laser beam through the light transmitting substrate.

11. A method for recording information on the optical information recording medium of claim 4, wherein recording is conducted by irradiating a laser beam through the light transmitting substrate.

12. A method for recording information on the optical information recording medium of claim 5, wherein recording is conducted by irradiating a laser beam through the light transmitting substrate.

13. A method the recording information on the optical information recording medium of claim 6, wherein recording is conducted by irradiating a laser beam through the light transmitting substrate.

14. A method for recording information on the optical information recording medium of claim 7, wherein recording is conducted by irradiating a laser beam through the light transmitting substrate.

* * * * *